United States Patent [19]

Dahlquist et al.

[11] Patent Number: 5,019,255
[45] Date of Patent: May 28, 1991

[54] DEVICE FOR SEPARATION OF A LIQUID MEDIUM CONTAINING CONSTITUENTS WHICH ARE SEPARABLE IN A FILTER

[75] Inventors: Erik Dahlquist, Västerås; Åke Enekull, both of Västerås, Sweden

[73] Assignee: ABB Atom AB, Västerås, Sweden

[21] Appl. No.: 269,416

[22] Filed: Nov. 10, 1988

[30] Foreign Application Priority Data

Nov. 12, 1987 [SE] Sweden ............................. 8704422

[51] Int. Cl.$^5$ ............................................. B01D 25/38
[52] U.S. Cl. ..................................... 210/225; 210/228; 210/230; 210/231
[58] Field of Search ............... 210/224, 225, 227, 228, 210/230, 231, 321.63, 334, 355, 413, 791, 415, 414; 100/196, 198

[56] References Cited

U.S. PATENT DOCUMENTS

| 419,775 | 1/1890 | Johnson et al. | 210/288 |
| 802,105 | 10/1905 | Johnson et al. | 210/228 |
| 1,042,803 | 10/1912 | Krassa | 210/225 |
| 1,889,225 | 11/1932 | Sperry | 210/225 |
| 1,891,396 | 12/1932 | Prutzman | 210/334 |
| 3,900,398 | 8/1975 | Gillette | 210/321.63 |
| 4,066,546 | 1/1978 | Sasaki | 210/791 |
| 4,171,266 | 10/1979 | Kurita et al. | 210/230 |
| 4,196,084 | 4/1980 | Schotten | 210/224 |
| 4,740,312 | 4/1988 | Dahlquist et al. | 210/334 |

Primary Examiner—Robert A. Dawson
Assistant Examiner—Matthew O. Savage
Attorney, Agent, or Firm—Watson, Cole, Grindle & Watson

[57] ABSTRACT

A device for separation of constituents, separable in a filter, from a liquid medium, comprising a stack of a plurality of plate units (10), arranged one after the other, with filters (11) arranged therein. Along the filters there are arranged rotors (24) for scraping off coatings deposited on the filters. Each rotor is mounted on a separate shaft piece (22) arranged in each plate. The shaft pieces are connected to each other by means of connections which can be drawn apart in the stacking direction of the plate units. Defects in the device can be detected in a channel (20) which extends in the stacking direction of the plate units and which is common to liquid having passed through the filter. A defective plate unit can be shut off, while maintaining the separation device in operation, and be replaced without dismantling the entire device (FIG. 7).

9 Claims, 5 Drawing Sheets

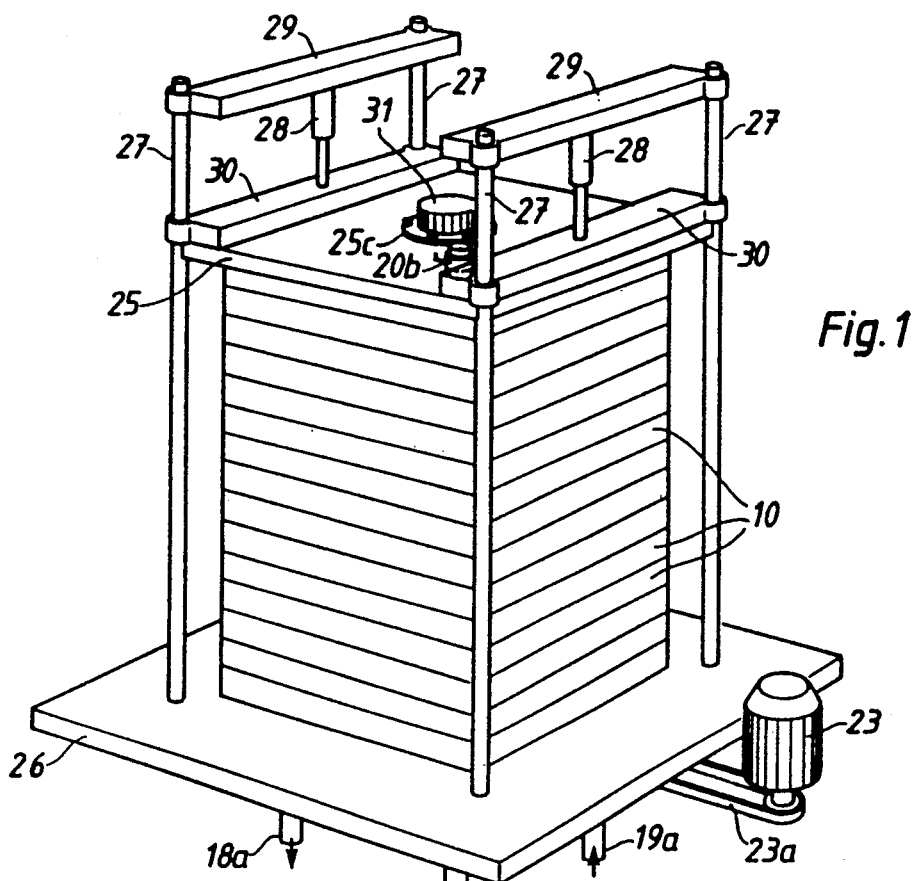
Fig.1
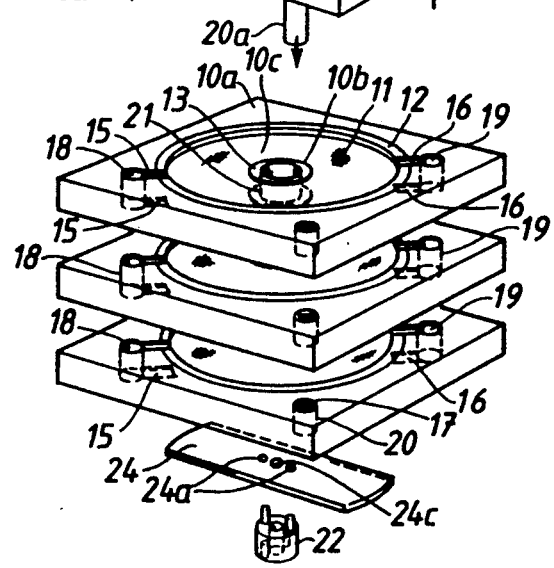
Fig.2a
Fig.2b
Fig.2c
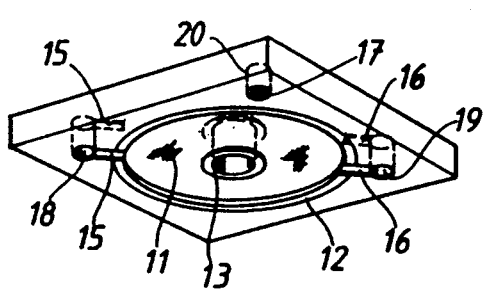
Fig.2d

DEVICE FOR SEPARATION OF A LIQUID MEDIUM CONTAINING CONSTITUENTS WHICH ARE SEPARABLE IN A FILTER

BACKGROUND OF THE INVENTION

The present invention relates to a device for separation of constituents, separable in a filter, from a liquid medium containing such constitutents, comprising a stack of a plurality of cells, each one containing at least one filter, one inlet for supply of a liquid medium on one side of the filter, one outlet for discharging part of the liquid medium—the reject—on the same side of the filter, one outlet for discharging liquid medium which has passed through the filter—the permeate—on the other side of the filter, and a rotor arranged on the first side of the filter and having parts which are movable along the surface of the filter.

A device of the above-mentioned kind is described in the U.S. Pat No. 4,740,312.

SUMMARY OF THE INVENTION

According to the present invention, it has proved to be possible to design a device of the kind referred to in such a way that individual cells in the stack can be shut off, when necessary, while maintaining the device in operation and such that individual cells can be replaced without the entire stack of cells having to be dismantled. In addition, it can be made extremely compact. According to the invention, this result is achieved by designing the device so that it comprises a stack of a number of plate units, arranged one after the other, which are formed with one outer portion, one inner portion, and a mid-portion located therebetween, wherein (i) the outer portion has a greater height than the mid-portion and the inner portion and makes contact, possibly with intermediate seals, with the outer portion on adjacent plate units (ii) the inlet for the liquid medium and the outlets for the reject and the permeate are arranged in the outer portion, (iii) when only one filter is used, this filter is arranged in the mid-portion on one side of the plate unit, and when two filters are used, these filters are arranged in the mid-portion on respective sides of the plate unit, (iv) the inner portion is provided with a through-hole in which is arranged a rotatable shaft piece, which supports a rotor with parts extending over the filter in the mid-portion, which shaft piece is connected to rotatable shaft pieces in the inner portion of adjacent plate units by means of connections which can be released by drawing in the stacking direction of the plate unit and one shaft piece in one of the plate units is connectible to a drive means, and (v) the plate units and the shaft pieces are arranged displaceable in relation to each other in the stacking direction of the plate units.

According to a preferred embodiment of the present invention, the shaft piece has the shape of a ring, the hole of which is oriented in the stacking direction of the plate units.

According to another preferred embodiment of the present invention, it comprises a press stand consisting of end pieces, arranged at the end surfaces of the stack, and rods cooperating with said end pieces for compression of the plate units in the stacking direction of the plate units.

According to still another preferred embodiment, the shaft piece is provided with gripping surfaces for a tool insertable into the stack of plate units through the shaft pieces, by means of which tool an optional number of shaft pieces, arranged one after the other in the stack of plate units, can be separated from the other shaft pieces arranged one after the other in the stack of plate units.

Other preferred embodiments of the present invention are indicated in the claims.

BRIEF DESCRIPTION OF THE DRAWINGS

The invention will be explained in greater detail by describing various embodiments, with reference to the accompanying FIGS. 1–11, wherein FIG. 1 schematically shows a device according to the present invention in perspective view;

FIGS. 2a, 2b, 2c and 2d show a number of plate units, seen from above, a rotor, a shaft piece and a plate seen from below in the device according to FIG. 1 in perspective view on the same scale, respectively.

DETAILED DESCRIPTION OF THE PREFERRED EMBODIMENTS

Figure 12:
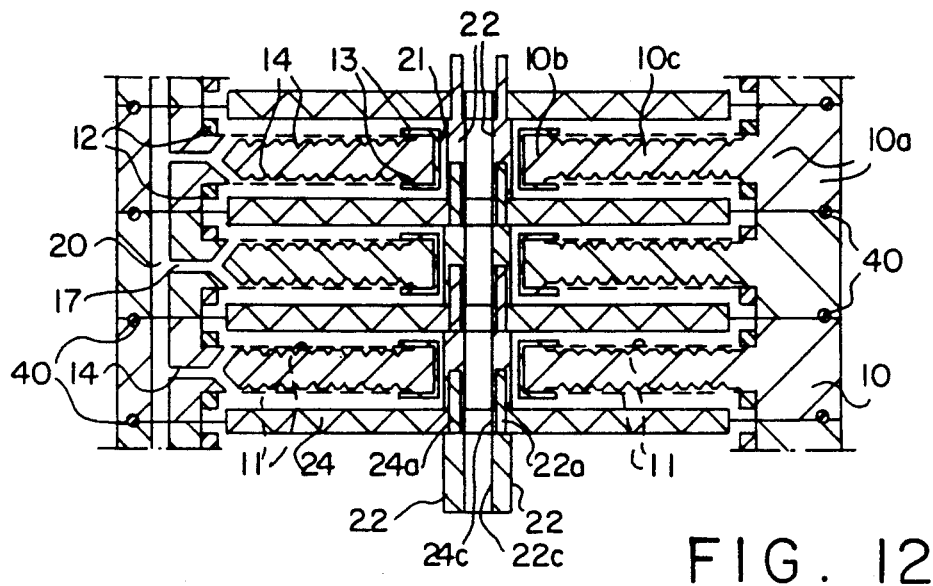
FIG. 12 shows part of the device according to FIG. 1 in a section through the rotor axis and the outlets.
Figure 13:
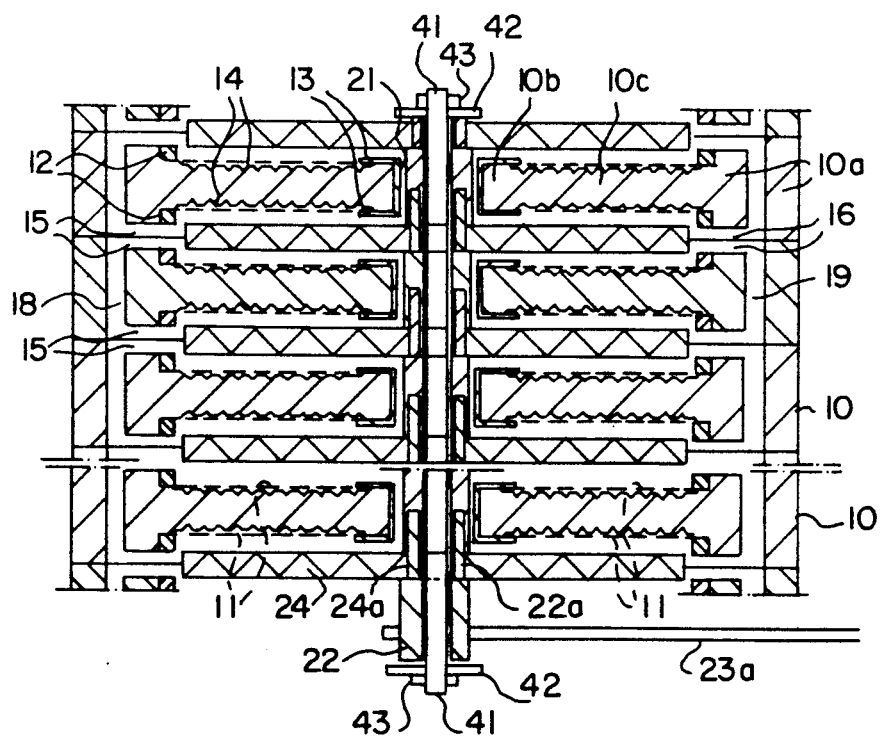
FIG. 13 shows a similar view as FIG. 4 showing the drive means and through-bolt.

The separation device according to FIGS. 1–4 comprises a stack of plate units 10 arranged one after the other, each one consisting of a plate formed in one piece, for example of glass fibre reinforced resin. Each plate is formed with an outer portion 10a, an inner portion 10b and a mid-portion 10c located there-between. The outer portion 10a, and in the exemplified case also the inner portion 10b, have a greater height (in the stacking direction of the plates) than the mid-portion 10c. The outer portion on one plate makes contact, by an intermediate sealing element, for example an O-ring 40 as shown in FIG. 12, with the outer portion of adjacent plates located on each side. The inner portion on one plate is arranged, in the stacking direction, with a gap relative to the inner portion of these adjacent plates. On the mid-portion 10c a filter 11 is arranged on each side of the plate, for example in the form of a filter cloth, a paper of fibrous material, or a dynamic membrane of the kind described in the above-mentioned U.S. patent. The filters are kept in position by clamping rings 12 and 13, respectively, of, for example, plastic, rubber, or metal. In the plate below the filters there are arranged channels 14 which communicate with each other within each plate. In the outer portion each plate has an inlet 15 for communicating the liquid medium which is to be subjected to separation, an outlet 16 for communicating that part of the liquid, the reject, which does not pass through the filter, and an outlet 17 for communicating that part of the liquid, the permeate, which passes through the filter. The inlet 15 and the outlet 16 have the form of relatively shallow and wide slots with rectangular cross section in the surface of the plate on that side where the associated filter is arranged, that is to say, they are located on the same side of this filter. The outlet 17 consists of a relatively shallow and wide recess with rectangular cross section in the centre of the outer portion and is located on the opposite side of this filter. The outlet 17 is arranged to commuinciate with the channels 14, as shown in FIG. 12. The inlets 15 on the different plates are connected to a channel 18, common to the inlets, arranged in the stacking direction of the plates in the outer portion of the plates. In similar manner, the outlets 16 are connected to a channel 19, common to these outlets, arranged in the stacking direction of the plates in the outer portion of the plates. In similar manner, the outlets 17 on the different plates are connected to a channel 20, common to them, which is also arranged in the stacking direction of the plates in the outer portion of the plates. Between the plates around the channels 18, 19 and 20, there are suitably arranged sealing elements (not shown), for example in the form of O-rings. These channels are connected to conduits 18a, 19a, and 20a, respectively, for the liquid medium which is to be treated in the separation device, the reject and the permeate, respectively. One or more of the channels 18, 19 and 20 may be arranged outside the stack of plates, for example in the form of vertical tubes connected to the outlets 15, 16 and 17, respectively.

Figure 3:
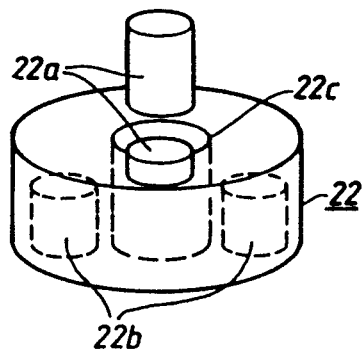
FIG. 3 shows the shaft piece in FIG. 2c in perspective view on an enlarged scale.
Figure 4:
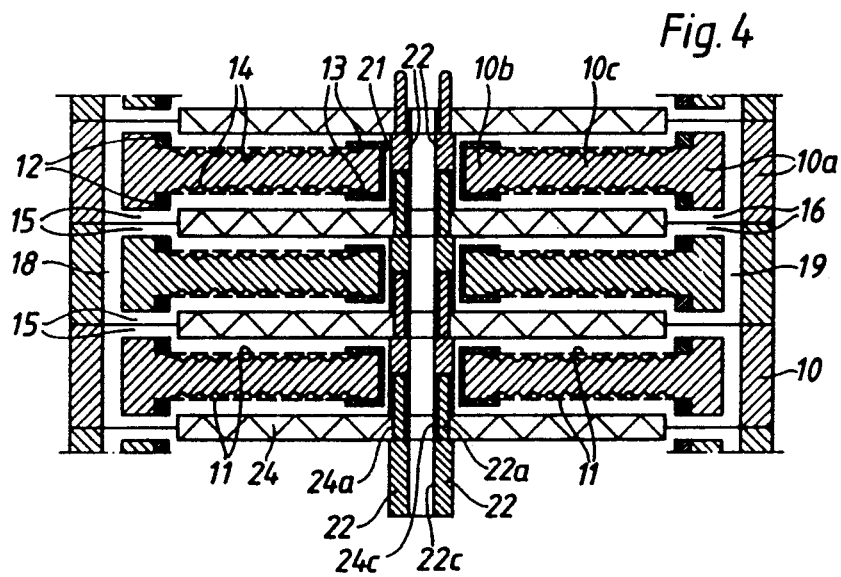
FIG. 4 shows part of the device according to FIG. 1 in a section through the rotor axis.

The inner portion 10b of each plate is provided with a through-hole 21. In this hole a rotatable shaft piece 22, preferably in the form of a ring, is arranged. The shaft piece suitably has a somewhat greater height than the inner portion 10b in which it is arranged. The shaft piece in the inner portion of each plate is connected to rotatable shaft pieces in the inner portion of adjacent plates, located on each side, by means of connections which may be released by drawing in the stacking direction of the plates only. The connections may, for example, consist of pins 22a on one side of the shaft piece and holes 22b, adapted to the pins, on the other side of the shaft piece. FIG. 3 shows only the lower part of the front pin in order to show the rear pin more clearly. The pins may advantageously have a "corrugated" surface to facilitate the release from the holes. 22c designates a central hole in the shaft piece. The pins in one shaft piece may thus be inserted into the holes on an adjacent shaft piece so that the shaft pieces form a coherent stack of shaft pieces connected together via the pins 22a and the holes 22b. The lowermost shaft piece is connected to a drive motor 23 with a driving belt 23a. The shaft pieces support rotors 24 in the form of rods or discs of, for example, glass fibre reinforced plastic or steel arranged on an outer surface of the filters 11. These may be permanently anchored to the shaft pieces or easily detachable, for example by being provided with holes 24a adapted to the pins 22a on the shaft pieces and arranged between two adjacent shaft pieces. If the shaft pieces are annular and provided with a central hole 22c, also the rotors are provided with such a hole 24c.

The plates are compressed in the stacking direction in a press stand comprising end pieces 25 and 26 and rods 27, which rods, at one end, are fixedly secured to an end piece 26 and at the other end are connected to pressure generating members 28, for example in the form of hydraulic cylinders or screw means, which between fixed beams 29 and via beams 30 displaceable along the rods exert a pressure on the end piece 25. The shaft pieces are also compressed in the stacking direction. This can be performed by fitting a through rod 41 connected to drive belt 23a with threaded ends through all the holes 22c and by arranging a washer 42 and a tightened nut 43 on each side of the stack of the shaft pieces. It can also be performed by keeping the shaft pieces compressed between the end pieces 25 and 26, the outermost shaft pieces being located under a lid 31 over the holes 25c and 26c (not visible) and rotatable bearings arranged between the lids and the outermost shaft pieces to enable rotatability of the shaft pieces.

Figure 5:
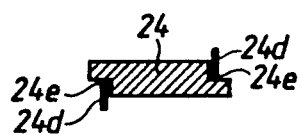
FIG. 5 shows a cross section of a rotor.

As illustrated in FIG. 5, the rotors are preferably provided with scrapers 24d for removing coatings formed on the filters. The scrapers may, for example, be of rubber and have the shape of blades or flaps. They may be attached to the rotor by means of joints 24e in such a way that they unfold when the rotor rotates in one direction but fold in when it rotates in a different direction. When the rotors are rotated with folded-in flaps, shearing forces are generated over the filter surface, which increases the passage through the filters.

The following describes the procedure when detecting damaged filters or plate units and for shut-off or replacement of plate units with damaged filters and damaged plate units, respectively.

Figure 6:
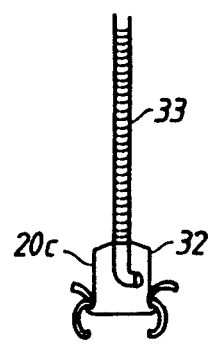
FIG. 6 shows a probe for sampling of permeate.
Figure 7:
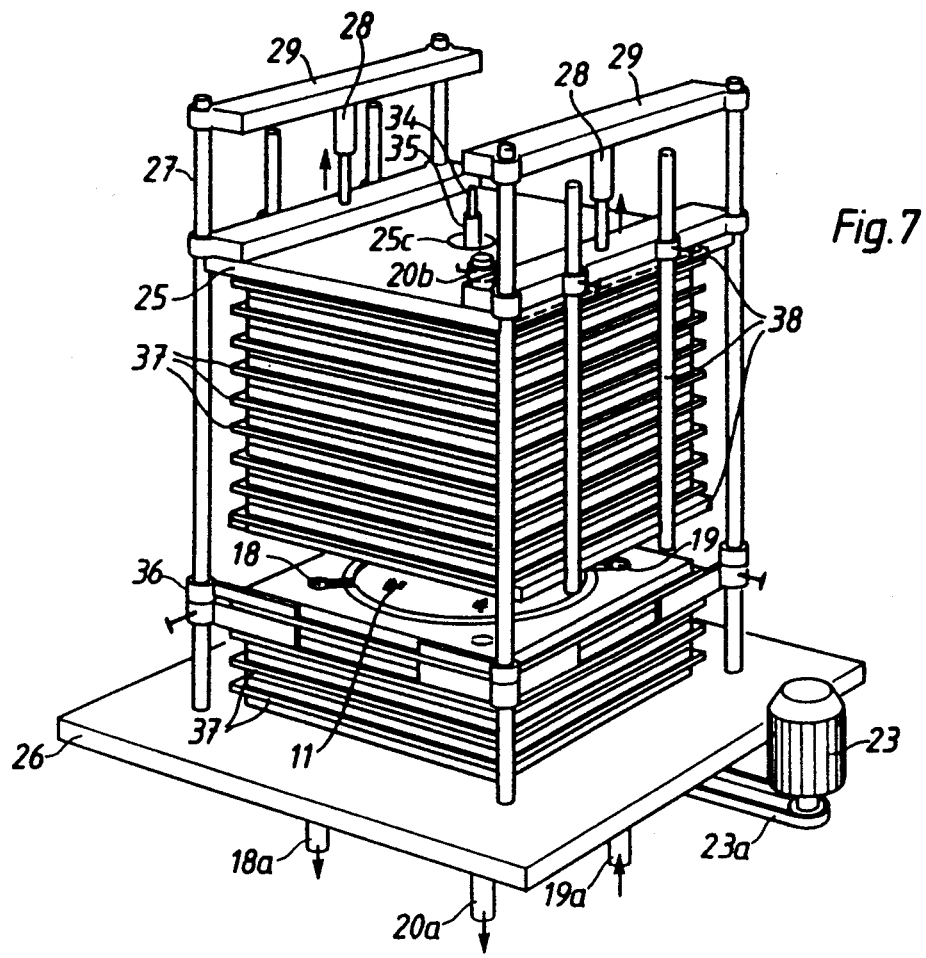
FIG. 7 shows the device according to FIG. 1, in which a plate is being replaced.

The separation device in FIG. 1 is provided at the top with a connection piece 20b connected to the permeate channel 20. To this connection piece a unit 32, shown in FIG. 6, can be connected. This unit is equipped with a part 20c, connectible to the connection piece, and with a probe 33 which can be passed down through the connection piece 20b in the permeate channel 20 for sampling. By passing down the probe at successively lower levels in the permeate channel, it can be determined if and, in such case, at which level the permeate is defective. If the probe is transparent, a turbidity caused by the defect may be visually observed, for example. The samples taken may, of course, also be analyzed chemically. If the pressure in the permeate channel is not sufficient for the permeate to become visible above the separation device without any measures being taken, the sampling can, of course, be carried out by sucking up the permeate.

When it has been determined that a defect exists, the permeate outlet 17 in that plate in which the permeate has proved to be marred by a defect can be shut off by inserting a plug from the permeate channel 20 into the outlet 17. This can be done by the use of a long tool which is inserted, via the connection piece 20b, into the permeate channel 20. As mentioned previously, both the detection and the sealing of the outlet 17 can be carried out while maintaining the separation device in operation.

If a plate in the stack is to be removed for repair or replacement, in accordance with FIGS. 7-10 a tool is inserted, after clamping devices retaining the shaft pieces 22 in the stacking direction of the plates have been removed, down through the hole 25c in the end wall 25 and through the holes 22c in the shaft pieces to the level where a plate is to be withdrawn. In the exemplified case, the tool consists of a long rod 34 and a tube 35 arranged around the rod and being displaceable along the rod. The rod 34 is fixed at the intended level by securing it to the rods 27 by means of essentially horizontal supports (not shown) arranged above the plate 25. The tube 35 is fixed to the end wall 25 by means of supports (not shown).

Figure 8:
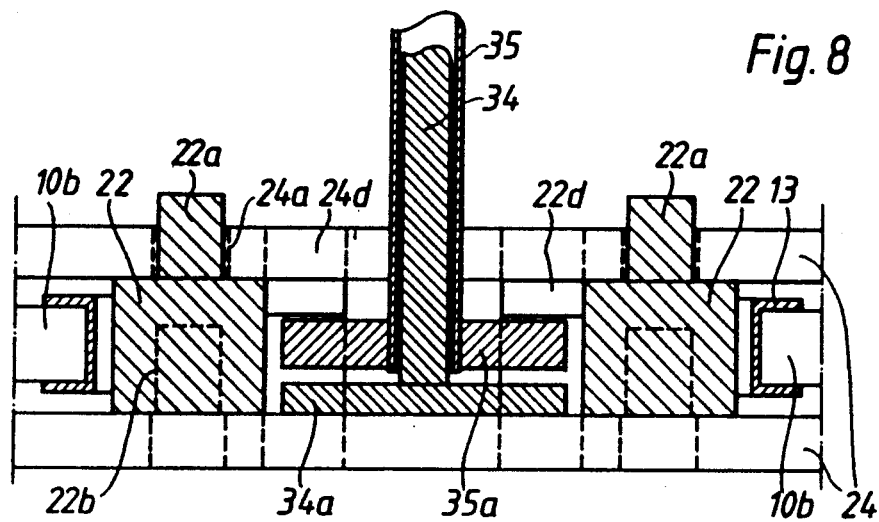
FIG. 8 shows part of the device according to FIG. 1 comprising the shaft piece, rotors and tools for drawing apart shaft pieces in a section through the rotor axis.
Figure 9:
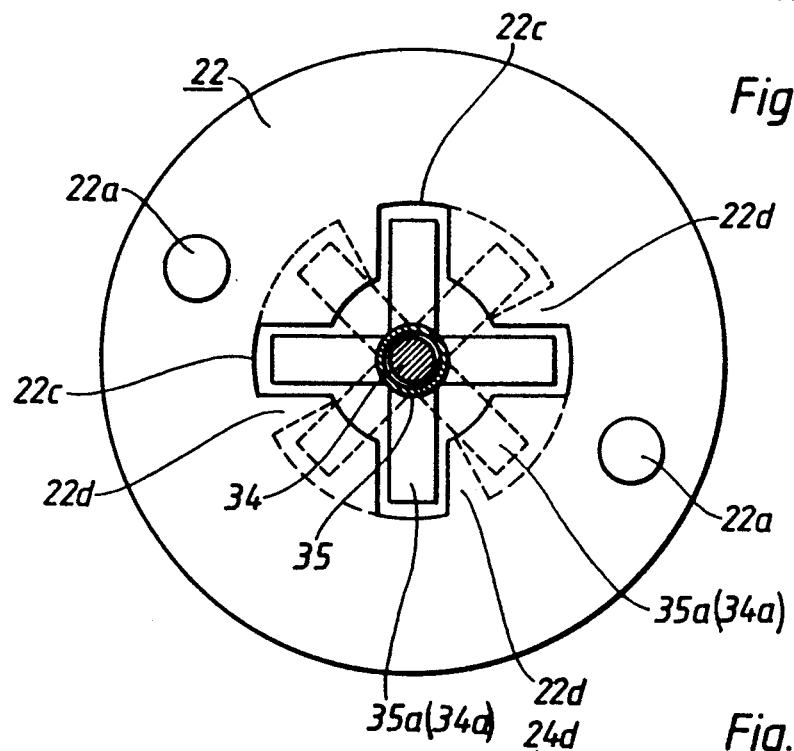
FIG. 9 shows a shaft piece in FIG. 8 seen in the direction of the rotor axis.
Figure 10:
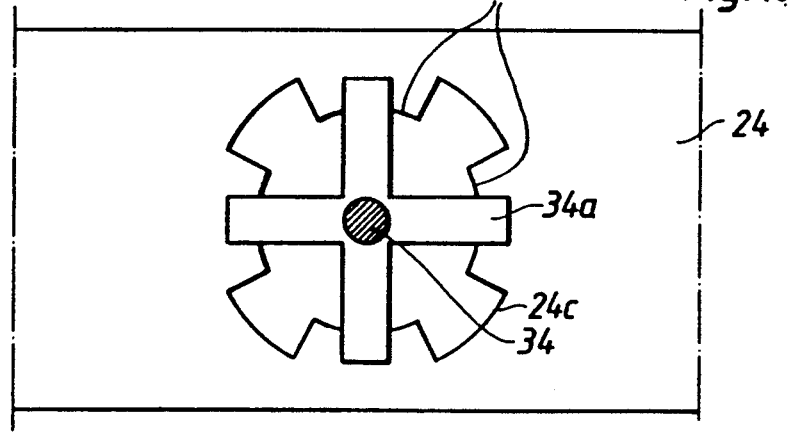
FIG. 10 shows part of a rotor seen in the same direction.

As will be clear from FIGS. 8–10, the rod 34 and the tube 35 in the exemplified case are provided at the bottom with projections 34a and 35a, respectively, and each shaft piece 22 in its upper part and each rotor are provided with parts 22d and 24d, respectively, projecting into the central holes 22c and 24c, respectively. In this way the rod 34, after its insertion into the central holes, may be brought by rotation to rest on the rotor which is arranged below the plate to be withdrawn from the stack. In similar manner, the tube 35, after its insertion into the central holes, can be brought by rotation to lie below the projecting parts 22d in the shaft piece in the plate to be withdrawn. The position of the projections of the rod is shown after the rotation in FIG. 10. The position of the projections of the tube before the rotation is shown in unbroken lines and the position after the rotation is shown in broken lines in FIG. 9.

That plate, which in the stack is positioned below that which is to be withdrawn, is secured to the pull rods 27 by clamping devices 36 which are attached to the rods and engage edges on the plate mentioned or projections 37 arranged on these edges. All the plates above that which is to be withdrawn are secured to each other and to the end piece 25 by means of C-clamps 38 or other suitable clamping devices. When this has been done and the pressure generating means 28 have been relieved, the package of plates which is held together by the clamping devices 38 can be lifted up together with the tube 35 which is secured to the end piece 25 and the shaft pieces which are located above the projections 35a on this tube, whereas plates which are located below the projections 34a on the rod 34 remain in their position. After lifting of the package, the plate located immediately underneath the package and the associated filter become exposed and can be withdrawn for repair, for example of a filter, or be replaced. When a repaired or new plate has been reinserted into the separation device, the stack is restored in its original condition.

Figure 11:
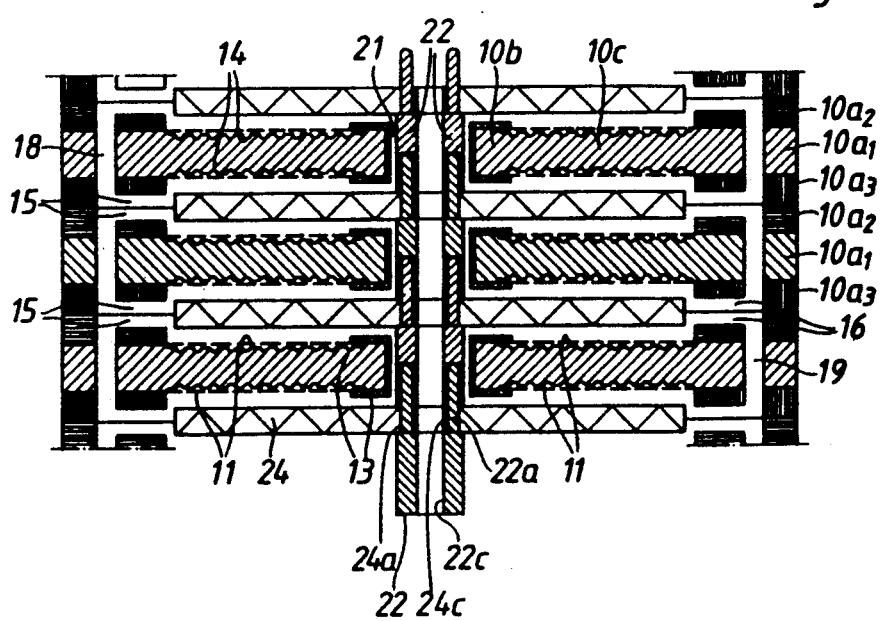
FIG. 11 shows a section of the same kind as in FIG. 4 for a modified embodiment of the device according to FIG. 1.

FIG. 11 shows an embodiment of the invention different from that illustrated in FIGS. 1–10. In this case the outer portion 10a consists of three separate portions $10a_1$, $10a_2$ and $10a_3$ arranged one after the other in the stacking direction of the plate units. The middle portion $10a_1$ forms a coherent unit with the mid-portion 10c and the inner portion 10b, which may advantageously be formed in the same way as in the first described embodiment of the invention. Each one of the portions $10a_2$ and $10a_3$ is annular and extends over the outer edge of the adjacent filter so that no separate clamping ring 12 is required. The outlets 15 and 16 are arranged in portions $10a_2$ and $10a_3$, as is clear from FIG. 11, and are connected to the channels 18 and 19, respectively. The unit consisting of the middle portion $10a_1$, the inner portion 10b and the mid-portion 10c may also, along a plane perpendicular to the stacking direction, be divided into two mirror-symmetrical parts with the outlet 17 located in slots in confronting surfaces in the outer portions of the mirror-symmetrical parts.

The separation device may be used for the removal of different constituents, separable in a filter, in a liquid medium. It can thus be used for the removal of solid or liquid undissolved constituents from a liquid, for example for cleaning of oil-containing water, for separation of slurries such as a coal-water slurry, a peat-water slurry and waste water from cellulose manufacture, and for high-molecular substances, dissolved in the liquid medium, such as humic acids, lignin compounds and polymeric substances.

It is, of course, also possible to use a filter on one side of a plate only and to replace the other filter with a whole wall without channels 14, i.e. without a connection with the channel 20. Such a filter, however, will not have the same capacity as that illustrated in the figures.

We claim:

1. A device for separation of constituents from a liquid medium, the device comprising a plurality of plate units stacked in a direction, each plate unit comprising two sheets of filter media located on opposite sides of the plate, one inlet communicating with each sheet for supply of a liquid medium, one outlet communicating with each sheet for discharge of the reject part of the liquid medium, one outlet communicating with channels located within the plate between the sheets for discharge of the permeate liquid medium which has passed through the sheet and a rotor arranged on an outer surface of each sheet and having parts which are movable along the outer surface of the sheet, wherein the improvement comprises:

the stack of plate units are arranged one after the other in the stacking direction and are formed with one outer portion, one inner portion, and a mid-portion located therebetween, wherein (i) the outer portion has a greater height than the mid-portion and the inner portion and contacts intermediate seals, which in turn contact the outer portion of adjacent plate units, (ii) the inlet for the liquid medium and the outlets for the reject and the permeate are arranged in the outer portion, (iii) The sheets are arranged in the mid-portion on respective sides of the plate unit, and (iv) each said inner portion is provided with a through-hole in which is arranged a respective ring-shaped rotatable shaft piece said shaft piece including a through-hole extending in the stacking direction and opposed sides oriented perpendicular to the stacking direction, each rotor being supported between the opposed sides of adjacent shaft pieces, each shaft piece including connections comprising at least one pin located on one of said opposed sides and at least one hole located on the other of said opposed sides, wherein each said at least one pin is located so as to be received within the said at least one hole of an adjacent shaft piece, whereby said connections can be released by drawing the connections, and therefore the plate units, in the stacking directions of the plate unit, and one shaft piece in one of the plate units is connectible to a drive means, whereby said shaft pieces comprise a shaft passing through the stack of plates and are divisible in the stacking direction.

2. A device according to claim 1, further comprising a press stand comprising end pieces, arranged at end surfaces of the stack, and rods cooperating with said end pieces for compression of the plate units in the stacking direction of the plate units.

3. A device according to claim 2, further comprising means for displacing the plate units along the rods in the press stand in the stacking direction of the plate units, whereby an optional number of plate units, arranged one after the other in the stack, can be separated from the other plate units arranged one after the other in the stack.

4. A device according to claim 1, including a through-bolt extending through all of the through-holes of said shaft pieces for compression of the shaft pieces in the stacking direction of the plate units.

5. A device according to claim 1, wherein the inlets for the supply of liquid medium in the outer portion on the different plate units are connected to a common channel which extends in the stacking direction of the plate units in the outer portion of the plate units.

6. A device according to claim 1, wherein the outlets for the reject in the outer portion on the different plate units are connected to a common channel which extends in the stacking direction of the plate units in the outer portion of the plate units.

7. A device according to claim 1, wherein the outlets for the permeate in the outer portion on the different plate units are connected to a common channel which extends in the stacking direction of the plate units in the outer portion of the plate units.

8. A device according to claim 1, wherein each said shaft piece is provided with gripping surfaces for a tool having matching projections and which is inserted into the stack of plate units through the through-holes of the shaft pieces, the gripping surfaces of the shaft pieces comprising projections on said shaft pieces which extend into the through-holes of the shaft pieces, the projection of the shaft pieces being arranged one after the other in the stack of plate units, whereby first shaft pieces can be separated from the other shaft pieces arranged one after the other in the stack of plate units by the projections of the inserted tool engaging the projections of the first shaft pieces.

9. A device according to claim 1, wherein the outer portion in one plate unit comprises a central portion, coherent with the inner portion and the mid-portion, and an annular plate arranged on each side of the central portion.

* * * * *